United States Patent [19]

Blaseck

[11] Patent Number: 4,948,187
[45] Date of Patent: Aug. 14, 1990

[54] CRANE OPERATED LIFTING APPARATUS

[75] Inventor: Klaus Blaseck, Ehlershausen, Fed. Rep. of Germany

[73] Assignee: Deutsche Gesellschaft fur Wiederaufarbeitung von Kernbrennstoffen mbH, Hannover, Fed. Rep. of Germany

[21] Appl. No.: 322,931

[22] Filed: Mar. 15, 1989

[30] Foreign Application Priority Data

Mar. 15, 1988 [DE] Fed. Rep. of Germany ....... 3808644

[51] Int. Cl.$^5$ .............................. B66C 1/54; B66C 1/66
[52] U.S. Cl. ........................................ 294/95; 294/906
[58] Field of Search ............. 294/16, 62, 82.32, 86.14, 294/86.24, 86.25, 89, 93–97, 111, 113, 110.1, 115, 116, 906

[56] References Cited

U.S. PATENT DOCUMENTS

| | | | |
|---|---|---|---|
| 405,001 | 6/1889 | Barton | 294/115 |
| 967,566 | 8/1910 | Russell | 294/95 X |
| 1,466,916 | 9/1923 | Pearl | 294/116 X |
| 1,592,286 | 7/1926 | Rymarz | 294/115 X |
| 2,670,233 | 2/1954 | Barchoff | 294/97 |
| 3,022,551 | 2/1962 | Marburg | 294/97 X |
| 3,033,605 | 5/1962 | Morrow | 294/97 |
| 4,068,879 | 1/1978 | Torbet et al. | 294/89 |
| 4,253,695 | 3/1981 | Blaive et al. | 294/95 |

FOREIGN PATENT DOCUMENTS

| | | | |
|---|---|---|---|
| 7010910 | 7/1970 | Fed. Rep. of Germany . | |
| 2842197 | 4/1980 | Fed. Rep. of Germany . | |
| 3808644 | 7/1989 | Fed. Rep. of Germany . | |
| 674967 | 7/1979 | U.S.S.R. | 294/95 |
| 1193100 | 11/1985 | U.S.S.R. | 294/95 |
| 1199737 | 12/1985 | U.S.S.R. | 294/95 |
| 1364593 | 1/1988 | U.S.S.R. | 294/95 |
| 733582 | 7/1955 | United Kingdom | 294/62 |
| 797839 | 7/1958 | United Kingdom . | |
| 1111176 | 4/1968 | United Kingdom . | |
| 2030256 | 4/1980 | United Kingdom . | |

*Primary Examiner*—Johnny D. Cherry
*Attorney, Agent, or Firm*—Cushman, Darby & Cushman

[57] ABSTRACT

The crane operated lifting apparatus for safely gripping and holding objects (11) includes a plurality of movable pawls (3) which enter into a groove, aperture, or bore (14) of an object (11) which is to be transported. To move the pawls (3), a driving member (4) is provided which is displaceable in a basic body (1). The lifting apparatus also includes comprises two holding members (2,5) the first of which is firmly attached to the basic body (1) while the second one is connected to the driving member (4) for a tilting or pivoting motion. Thus, the hook of a crane may selectively grasp either one of the two holding members (2,5) or both of them (2,5) together, and it may also selectively swing the second holding member, (5). In this manner it is possible to have all the functions, such as locking, unlocking, and conveying, accomplished by the hook of a crane alone.

16 Claims, 9 Drawing Sheets

CRANE OPERATED LIFTING APPARATUS

FIELD OF THE INVENTION

The present invention relates to a conveying means for gripping and safely moving objects, comprising a first holding member to be grasped by a crane and movable pawls adapted to be moved back and forth between two limit positions by a driving member, the pawls seizing and locking to the object in their first limit position and releasing the same in their second limit position.

BACKGROUND OF THE INVENTION

Such a conveying means is known from DE-OS 28 42 197. That publication shows a so-called clasping or adhesive plate serving as a releasable coupling member between the hook of a crane and an object to be moved. The latter has two protruding carrier pins which are engaged by pawls of the carrying plate. These pawls are moved by a wedge-like driving member between first and second limit positions. In one limit position the pawls release the carrier pins, while they engage behind the same in the other limit position, thereby locking the clasping plate to the object which is to be conveyed.

The wedge-like driving member in that case is moved back and forth by a remote controlled hydraulic cylinder. That is highly disadvantageous because hydraulic lines must pass from a remote control station all the way to the clasping plate and these hydraulic lines must cover the entire sweep of the hook of the crane. Of course, this is expensive and also very susceptible to disturbance. Furthermore, the objects to be gripped and moved must have carrier pins of special design, and those cannot be used for reasons of space alone in plants or with the structural elements inside the same if they are to be serviced by remote handling.

The subject matter of the invention relates more generally to remote handling techniques and, more specifically, to the special field of crane operation. Remote handling techniques are applied wherever the entrance of staff members is undesired, especially in nuclear and chemical plants.

The central member in crane operation is a crane, of course, and its rope and hook. The respective necessary tools, gripping members, or objects to be moved are suspended from the hook of the crane. Previously, in plants which had to be serviced by remote handling, the individual members were provided with lifting eyes to be engaged by the hook of the crane. The lifting eyes, of course, had to be mounted at the position of the center of gavity of the individual structural members of the system. This required a great number of points of attack because the position of the center of mass changes constantly when structural groups are disassembled into subgroups or are mounted in a system. Moreover, the points of attack may be covered by the subgroups. Lifting eyes were mounted on parts which were not covered. Covered parts, on the other hand, were provided at the position of the center of gravity with an internal thread into which an eye ring could be threaded by means of a manipulator, if required. However, it is a complicated handling step to thread annular screws or eyes into the exposed structural member by remote operation. Canting and damaging of the internal thread cannot be excluded. As a consequence, the threads must be re-cut which requires the structural groups to be removed into areas of higher handling quality.

SUMMARY OF THE INVENTION

It is an object of the invention to improve the conveying means mentioned initially such that it will have a simpler structure and be less susceptible to trouble. This object is met in accordance with the invention, in a conveying means of the generic kind in question in that a second movable holding member is provided which is connected to the driving member. The two holding members are movable with respect to each other such that the pawls are moved into one limit position when the hook grasps the second holding member and the pawls are moved into another limit position when the hook releases the second holding member.

The invention provides the following advantages:

All of the functions of the conveying means is suitable for remote control exclusively by the hook of the crane, especially the operations of locking and unlocking, and no additional active secondary means are required to accomplish the locking.

The part to be moved must be provided with nothing but robust bores or grooves and does not require any screw eyes, internal threads, etc.

No additional operating means, such as manipulators etc. which are required with the state of the art to apply the auxiliary eyes are required to use the present invention.

The conveying means has a very simple mechanical structure and, in its preferred embodiment, operates without any spring mechanisms. Only the forces acting through the hook of the crane and through gravity are utilized for operation. In this manner, a particularly reliable conveying means is obtained which, moreover, is crash-proof.

In the case of the embodiment of the invention described below, the locking is accomplished by pawls being spread outwardly and engaging behind a groove or bore of the object to be transported. In other words, this is a so-called internal gripper. Of course, the invention may be applied also to external grippers with which pawls or gripping claws are moved radially inwardly in the locking position and grasp or seize a projection which, for example, may be shaped like a mushroom.

BRIEF DESCRIPTION OF THE DRAWINGS

The invention will be described further, by way of example, with reference to the accompanying drawing, in which.

DESCRIPTION OF THE PREFERRED EMBODIMENTS

Like reference numerals in the various figures designate like members.

Figure 1:
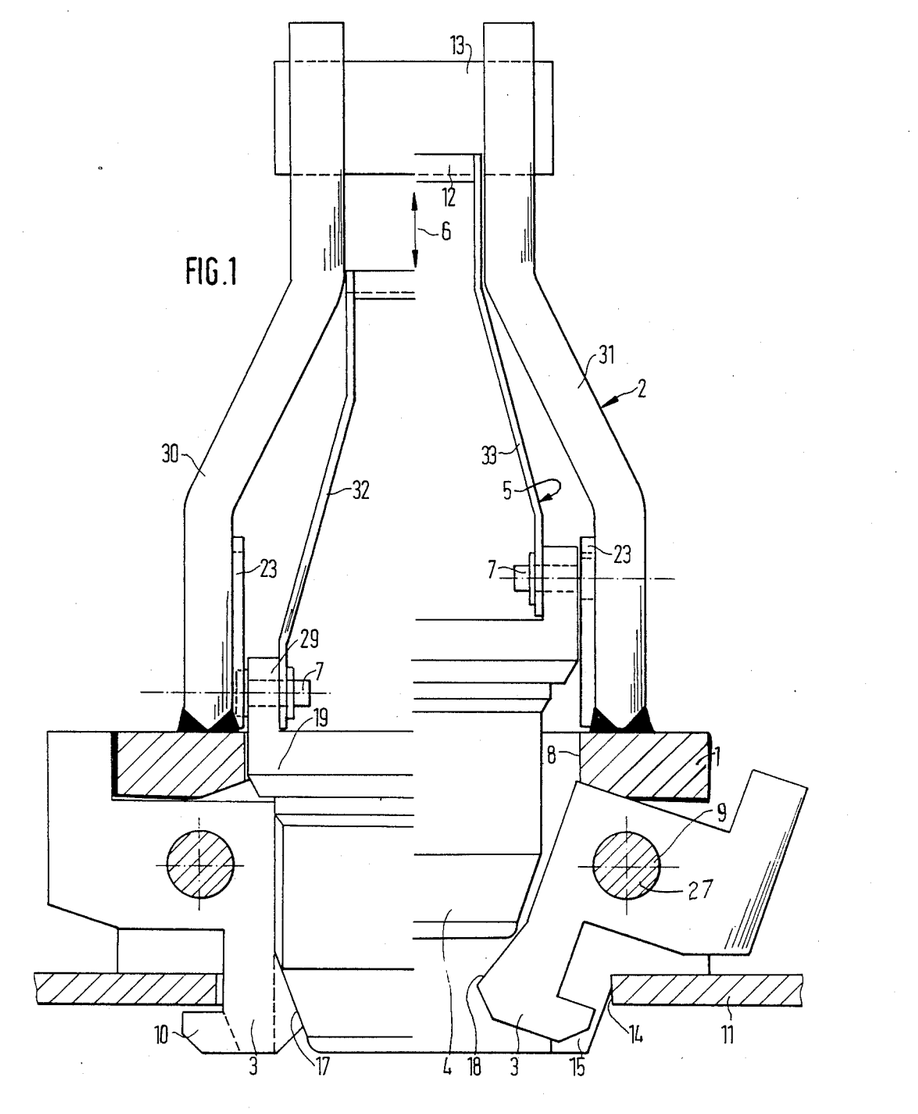
FIG. 1 is a part sectional side elevation of the conveying means in the two limit positions.
Figure 16:
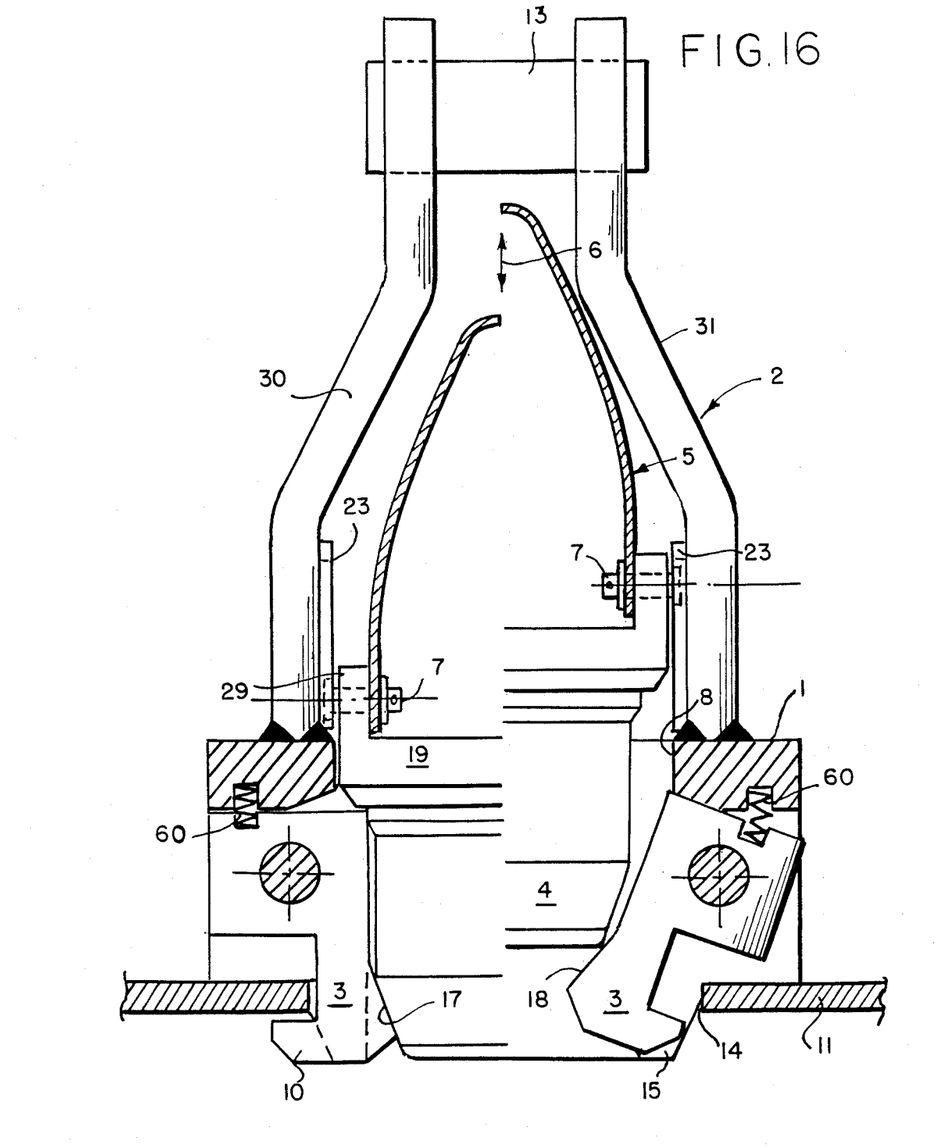
FIG. 16 is a part sectional side elevation of an alternative embodiment.

The conveying means shown in FIG. 1 comprises a basic body 1 to the top of which is welded plates 30 and 31 of a first holding member 2. A transverse connecting member 13 of the first holding member 2 can be grasped by the hook of a crane. A plurality of pawls 3, three in the embodiment shown, are pivotably mounted on the basic body 1 and their pivoting motion is initiated or caused by a driving member 4. Plates 32 and 33 of a second holding member 5 are mounted at the top of the driving member 4. A transverse connecting member 12 of the second holding member 5 can likewise be seized by the hook of the crane. In contrast to the first holding member 2 which is rigidly connected to the basic body 1, the second holding member 5 can be tilted with respect to the driving member 4 and, in addition, displaced with respect to the first holding member 2, as indicated by arrow 6. Hereby the second holding member 5 may be moved away from the first holding member 2 by a distance which permits the hook of the crane to seize the one holding member alone without being obstructed. In the embodiment shown, the pivotability of the second holding member 5 is obtained by the fact that the latter is attached to the driving member by swing bearings 7. The tilting position described is shown more clearly in FIG. 2. The displaceability of the second holding member 5 serves to effect linear displacement of the driving member 4 with respect to the basic body 1. In an alternative embodiment, at least a portion of the second holding member can be a wire as seen in FIG. 16.

The driving member 4 is guided in a central through bore 8 of the basic body 1. The pawls 3 in turn are supported in the basic body 1 in a manner such that they will project partly into the through bore 8, depending on the pivoting position. In this respect, care is taken that there is always a force urging these parts of pawls 3 into the through-bore 8. That may be accomplished by spring pressure provided in one embodiment by springs 60 as seen in FIG. 16 or, as in the embodiment shown in FIG. 1, by gravity as the pawls 3 are of such design that their mass center is offset outwardly with respect to the pivot axis 9 of the pawls 3, i.e. in a direction away from the through-bore 8. This results in a torque causing the desired pivoting motion.

When the driving member 4 is moved to the top, as shown in the right part of FIG. 1, pawl 3 can swing, whereby its gripping claw 10 becomes displaced radially inwardly, thereby unlocking from to a coupling plate of the object 11.

On the other hand, when the driving member 4 is pressed down into the through-bore 8, as shown in the left half of FIG. 1, the pawls 3 swing so that the legs extending into the central through-bore 8 become spread outwardly, whereby the gripping claws 10 engage behind the object 11 so that the conveying means and the object 11 are locked together.

The movement of the driving member 4 in the one direction is effected by the pull of the hook of the crane and in the other direction by gravity alone. When the crane hook first grasps the second holding member 5 and pulls it upwardly, the driving member 4 is also pulled upwardly until the conveying means is unlocked. When the second holding member 5 has been pulled up so far that its upper transverse connecting member 12 touches the transverse connecting member 13 of the first holding member 2, the entire conveying means is lifted by the hook of the crane as the pull continues.

When, conversely, the hook of the crane is lowered from this position, specifically on to a receiving aperture 14 of the object 11, the basic body 1 becomes centered in the receiving aperture 14 by a cone 15 formed at its bottom until a shoulder 16 (FIG. 4) becomes seated on the object 11. As the hook of the crane is lowered further, the second holding member 5 and consequently also the driving member 4 connected to the same, can move downwardly by gravity alone. Hereby the pawls 3 spread outwardly in the manner described above, thereby locking the conveying means to the object 11.

The bottom of the driving member 4 is formed with a chamfer 17 to prevent any wedging or canting at the counter-faces of the pawls 3. The pawls 3 are formed in a similar manner with an inclination 18 which is adapted to the angle of inclination of the chamfer 17 and which projects toward the center of the through-bore 8. This is shown more clearly in the left half of FIG. 1.

At its upper end, the driving member 4 has a collar 19 projecting radially outwardly and having a downwardly directed shoulder 20 (FIG. 7) which rests on an edge 21 (FIG. 5) of the basic body 1 when the driving member 4 has been lowered completely. The edge 21 is formed by an enlargement of the through-bore 8. The cooperation between the shoulder 20 and the edge 21 thus provides a stop to the movement in the one direction.

Figure 2:
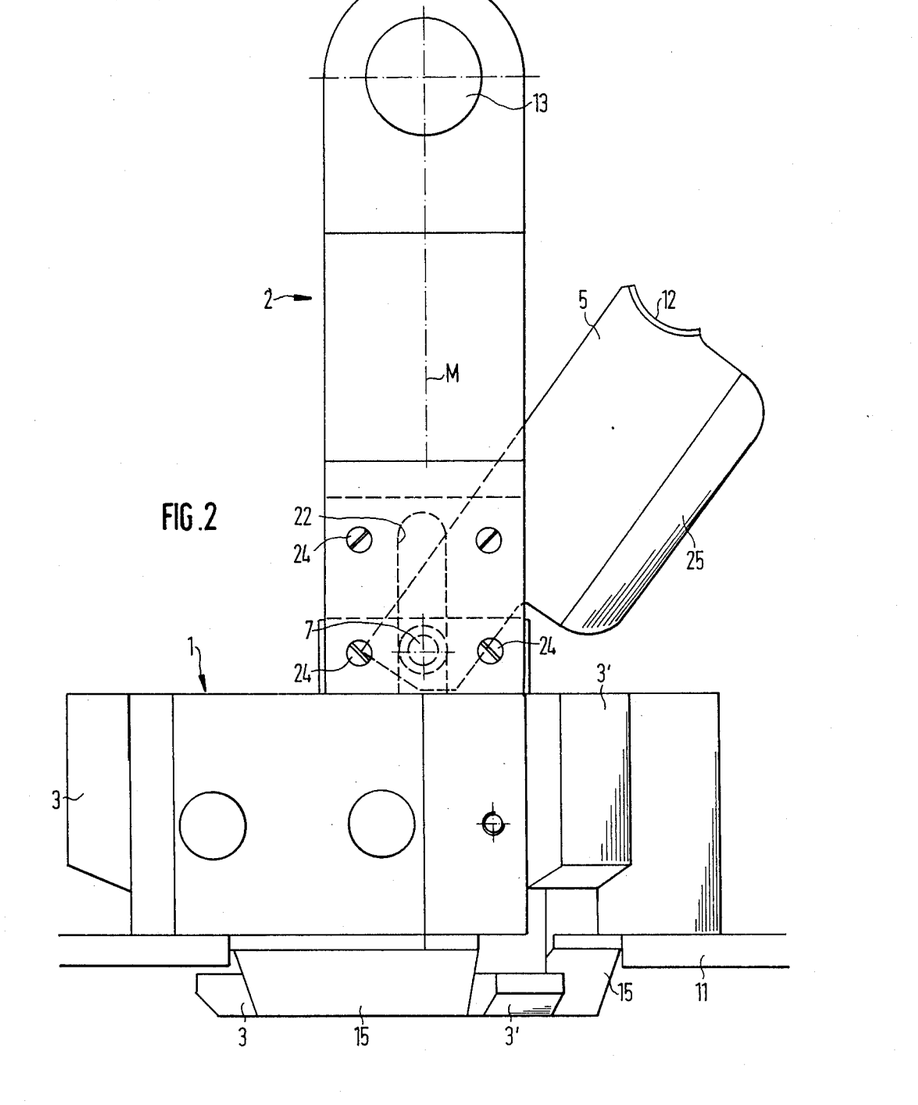
FIG. 2 is a side elevation rotated by 90° with respect to FIG. 1.

The driving member 4 is guided in addition by the supporting pins of the swing bearings 7 as they protrude laterally from the driving member 4, each pin guided in a slot 22 (FIG. 2) of lateral guide plates 23. These guide plates are secured to vertical portions of the first holding member 2, for instance by screws 24 as indicated in FIG. 2. This provides not only upper guidance for the linear displacement of the driving member 4 but also a stop to movement preventing the driving member 4 from being pulled out altogether when the second holding member 5 is swung laterally (see the position shown in FIG. 2). In this respect, however, it should be noted that in the unlocked position (right side of FIG. 1) the connecting member 12 of the second holding member 5 enters into contact with the connecting member 13 of the first holding member 2 before the pin of the swing bearings 7 have reached the ends of the slots 22. This assures that the guide plates 23 never take up the full load of the conveying means, regardless of whether object 11 is being grasped or not.

FIG. 2 clearly shows that the second holding member 5 may be swung out laterally. This makes it possible for the conveying means to be grasped by the first holding member 2 alone, while the second holding member 5 together with the driving member 4 are in a lowered position and the conveying means is consequently locked. Furthermore, it should be emphasized that any lateral swinging of the second holding member 5 is not possible unless the driving member 4 is lowered because the shape of the connecting member 12 of the second holding member 5 in combination with the shape of the connecting member 13 of the first holding member 2 produces an overlap, preventing any overswing when the second holding member 5 is pulled up. The tilting position of the second holding member 5 is thus an indication which can be recognized at a great distance of whether the conveying means is locked or unlocked.

Figure 10:
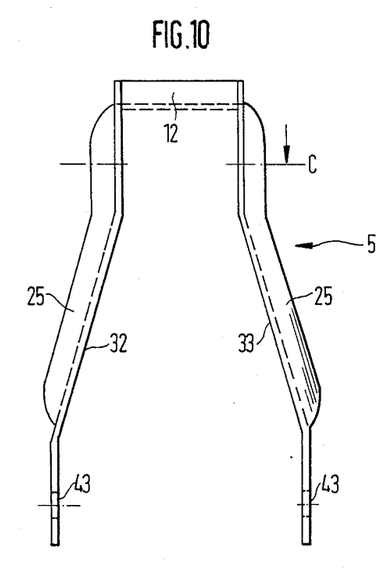
FIG. 10 is a side view of the second holding member.
Figure 11:
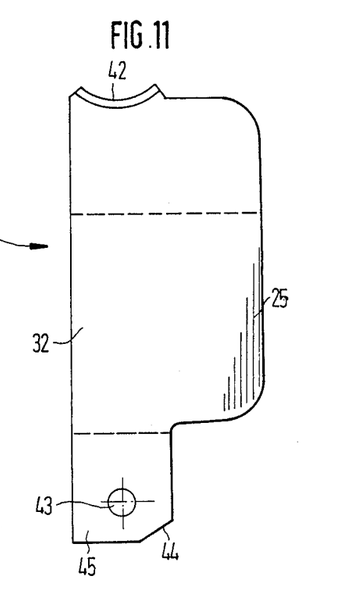
FIG. 11 is a side view of the second holding member rotated by 90°.
Figure 12:
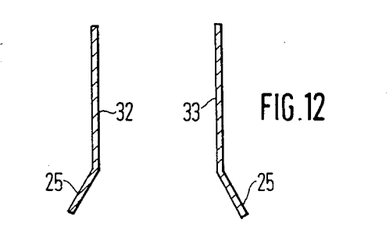
FIG. 12 is a sectional elevation along line C—C of FIG. 10.

It may further be seen in FIG. 2 that the second holding member 5 has wings 25 projecting from one side (see also FIGS. 10–12). These guarantee that the second holding member can be swung out in one direction only (to the right in FIG. 2). In the other direction, it can be swung only to a point at which the wings 25 abut against the first holding member 2 which corresponds exactly to the vertical position.

The specific structure of the conveying means in accordance with an embodiment of the invention will be explained in greater detail below with reference to the drawings showing individual parts.

Figure 3:
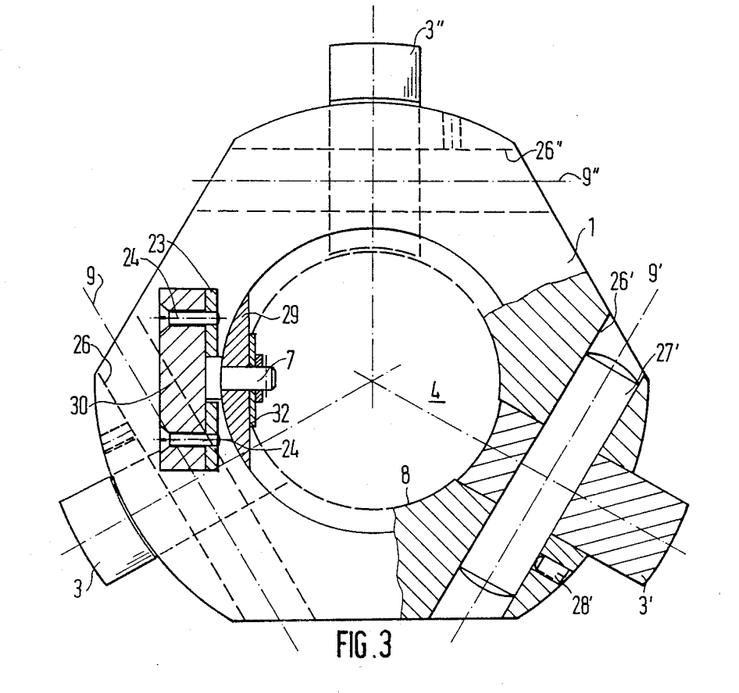
FIG. 3 is a part sectional elevation of the bottom side of the conveying means.

FIG. 3 serves particularly to illustrate the fastening of the pawls 3, 3', and 3" at the basic body 1. Bores 26, 26', and 26" are provided passing through the basic body 1 and their axes, corresponding to the pivot axes 9, 9', 9" of the pawls 3, are located at angles of 60° with respect to each other serve to take up bearing pins of which only the supporting pin 27' is shown in FIG. 3. Set screws, of which set screw 28' is shown, make sure that the supporting pins cannot fall out.

In the left part of FIG. 3, a section may be seen through parts of the two holding members 2 and 5. The plate 30 of the first holding member 2 is welded to the basic body 1 and the guide plate 23 is attached to the plate 30 by means of the screws 24. The attachment of the swing bearing 7 to the plate 32 of the second holding member 5 at a web 29 of the driving member 4 can also be seen. Unshown plates 31 and 33 opposite plates 30 and 32 respectively, are similarly treated.

Figure 4:
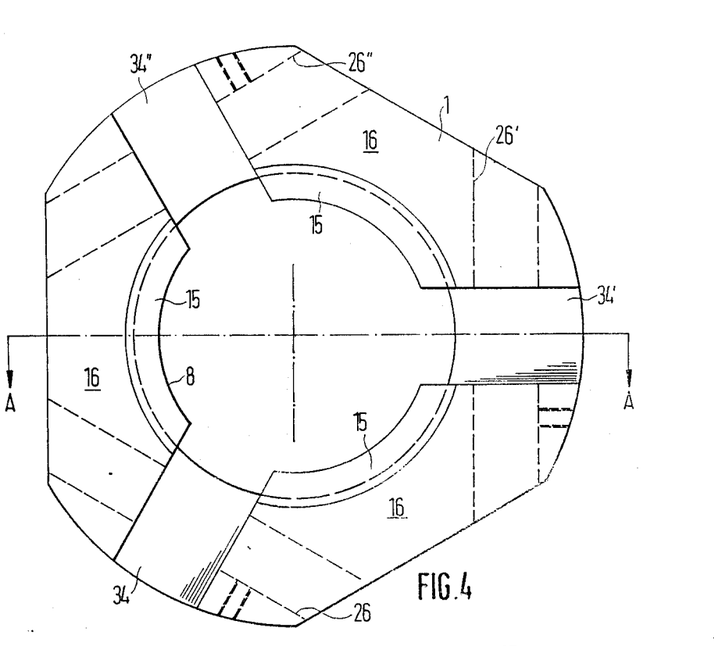
FIG. 4 is a top plan view of the basic body of the conveying means.
Figure 5:
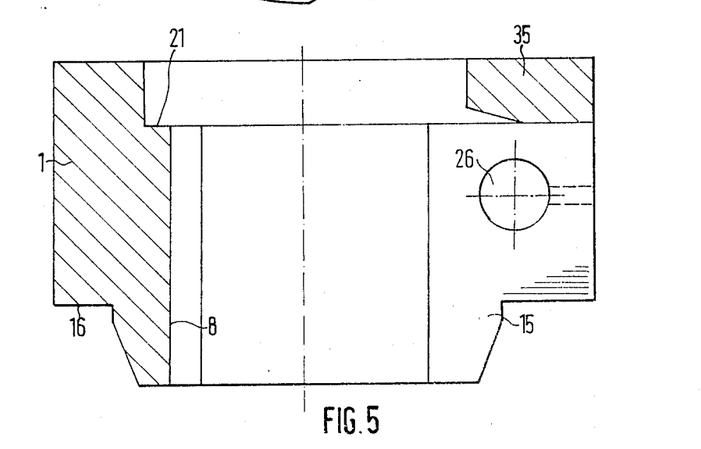
FIG. 5 is a longitudinal sectional view of the basic body.

FIGS. 4 and 5 present two views of the basic body 1. The view of the bottom of the basic body according to FIG. 4 clearly shows the cone 15 and the shoulder or support surface 16 by which the driving member 4 is placed on the object 11. FIGS. 4 and 5 also show three recesses 34, 34', and 34" serving to take up the pawls 3, 3', and 3", respectively. These recesses do not extend all the way through the axial length of the basic body 1, as may be taken from FIG. 5. Rather, a portion 35 of the shape of an annular disk is left at the top to which the plates 30 and 31 of the first holding member 2 are welded. As shown in FIG. 1, this portion also serves as a stop for the pivoting movement of the pawls 3.

Figure 6:
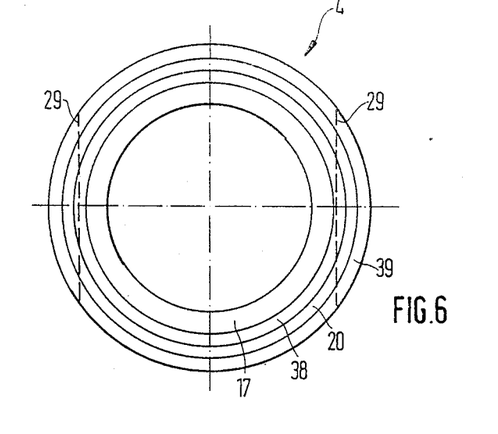
FIG. 6 is a view of the front face of the driving member.
Figure 7:
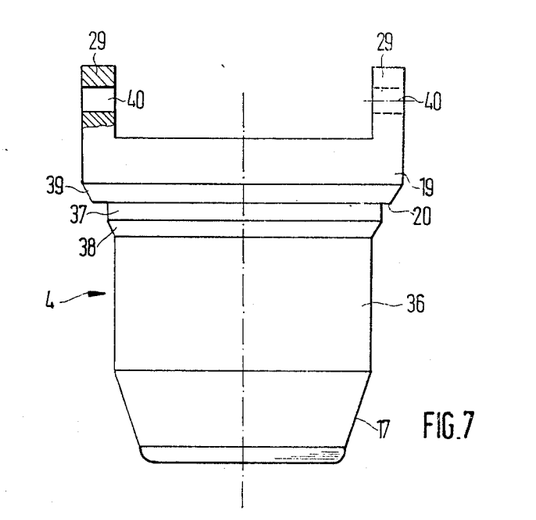
FIG. 7 is a side view of the driving member.
Figure 8:
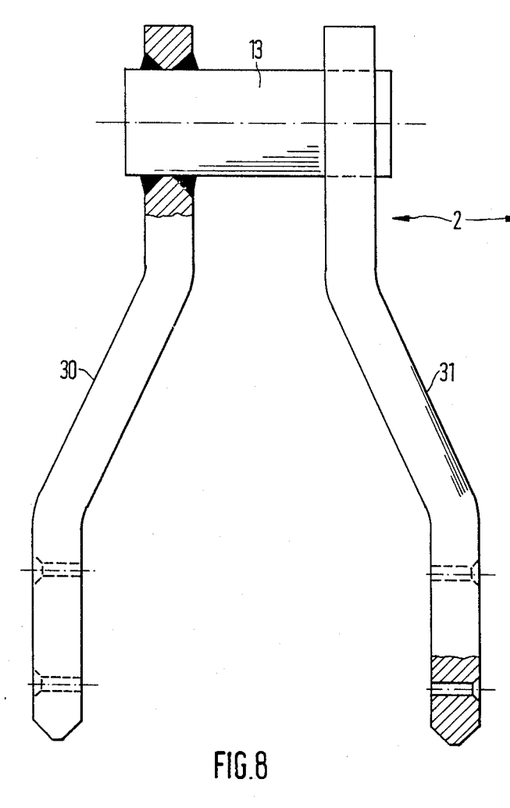
FIG. 8 is a side view of the first holding member.
Figure 9:
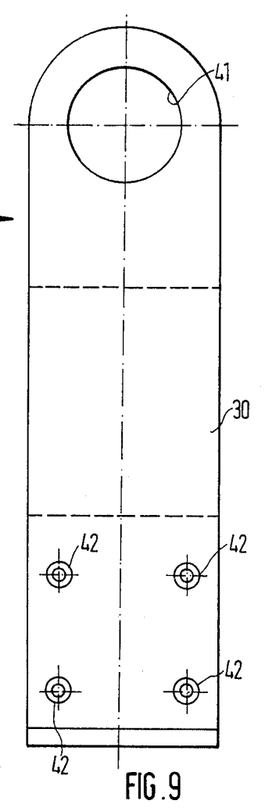
FIG. 9 is a side view of the first holding member rotated by 90°.

FIGS. 6 and 7 are more detailed representations of the driving member 4. It is substantially cylindrical and has the chamfer 17 at its one end acting as a cone for the pivoting movement of the pawls. At its other end and adjacent a cylindrical central piece 36, the driving member 4 has a centering collar 37 formed with a chamfer 38. When the driving member 4 is introduced into the central through bore 8, this centering collar engages the bore. The centering collar is followed, via another chamfer 39, by the radially projecting collar 19 whose downwardly directed shoulder 20 comes to rest on the edge 21 (FIG. 5) of the basic body 1. Two lateral webs 29 which are exactly opposite each other and have horizontal through-bores 40 extend away from the collar 19. These webs 29 are fastened to the plates 32 and 33, respectively, by the supporting pins of the swing bearings 7 passing through the bores 40. FIGS. 8 and 9 represent the first holding member 2 in two different lateral views. The two plates 30 and 31 of the first holding member 2 each have an aperture 41 at one end through which the connecting member 13 is passed and welded to the plates. Four bores 42 are provided in the other end of each plate 30, 31 for passage of the screws 24. The two plates 30, 31 and the connecting member 13 together form an approximately U-shaped saddle and the hook of the crane engages the connecting member 13, shown here in the form of a cylindrical bolt.

FIGS. 10–12 show various views of the second holding member 5. The two plates 32 and 33 are interconnected at one end by the connecting member 12. As already mentioned with reference to FIG. 2, the plates 32, 33 have wings 25 which are bent laterally at an angle and serve as stops for pivoting motion. The connecting member 12 is configured at its outwardly facing top side 42 to the outer contour of the connecting member 13 of the first holding member. In the embodiment shown, it is formed cylindrically convex toward the outside for a snug fit to the connecting member 13. At their other ends the plates 32 and 33 each have a bore 43 to take up the supporting pins of the swing bearings 7 (FIG. 2). Furthermore, lower corners 44 of the plates 32, 33 are beveled to make sure that swinging is possible (in clockwise sense in the case of FIG. 11) up to a stop which is given when the beveled corners 44 abut the upper side of the basic body 1 (see FIG. 2). The other corners 45 which are not likewise beveled can serve as a stop for the pivot position of the holding member 5, arresting it in a vertical position. In this embodiment, the primary function of the wings 25 is not that of stopping the pivoting of the second holding member 5 but of guiding the entry of the hook of the crane through the second holding member 5.

Figure 13:
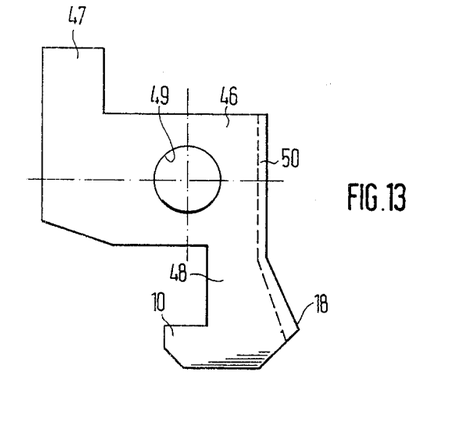
FIG. 13 is a side elevation of a pawl.
Figure 14:
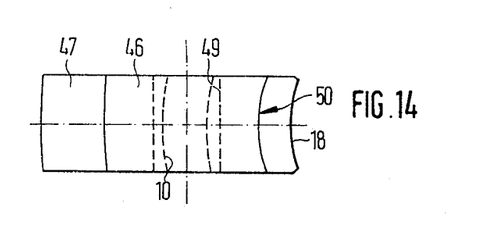
FIG. 14 is a top plan view of the pawl shown in FIG. 13.

FIGS. 13 and 14 show one of the pawls in greater detail. The pawl 3 has a horizontal central piece 46. One end thereof (the left one in FIG. 13) is followed by a vertical portion 47 which projects upwardly in the normal operating position (FIG. 1). At the opposed end of the central piece 46 there is a leg 48 which extends downwardly. The free end of the leg 48 has another horizontal portion constituting the gripping claw 10. There is a given relation between this gripping claw and a bore 49 extending through the central piece 46 and receiving the supporting pin 27. This bore is offset toward one side with respect to the position of the center of gravity of pawl 3, this being the side of the gripping claw 10. As a consequence, gravity alone provides a torque which rotates the pawl 3 such that the gripping claw 10 disengages from the object 11 when unlocked by the driving member 4. In other words, the pawls effect unlocking by gravity, whereas they lock by the force of the driving member 4. It is likewise conceivable to have spring pressure act on the pawls for locking or unlocking as well as having C-shaped pawls as seen in FIG. 16 as opposed to the S-shaped pawls in FIGS. 13 and 14.

The inclination 18 (see also FIG. 1) is provided in the form of a projection extending obliquely in the area of the leg 48, specifically opposite the gripping claw 10. The side of the pawl 3 facing into the interior of the through-bore 8 (FIG. 1) is formed with a flute 50 adapted to the rounding of the through bore 8 and thus, also to the rounding of the driving member 4. The cylindrical centering collar 37 and the frustoconical cone 17 of the driving member 4 in particular may engage in this flute 50, whereby the pivot position of the pawls is defined unambiguously and precisely.

Figure 15:
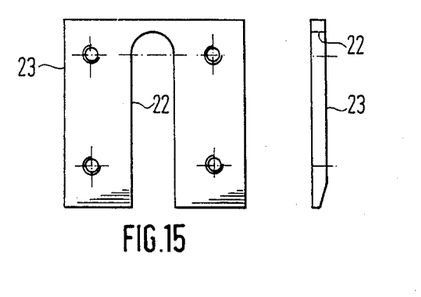
FIG. 15 presents two views of an individual part of the conveying means.

FIG. 15, finally, shows the guide plates 23 together with the slot 22 which is formed as an open oblong hole (see also FIGS. 1, 2, and 3).

What is claimed is:

1. A conveying means for remotely gripping and safely moving objects by means of a crane, comprising a first holding member to be grasped by a crane hook and movable pawls adapted to be moved back and forth between first and second limit positions by a driving member, the pawls engaging the object in their first limit position and releasing the same in their second limit position, wherein a second movable holding member is provided which is connected to the driving member, the two holding members being movable with respect to each other, the pawls being moved into one of the first and second limit positions when the hook grasps and pulls the second holding member, and the pawls being moved into the other of the first and second limit positions when the hook releases the second holding member, the two holding members being movable with respect to each other in such a manner that one of the two, selectively, can be grasped by the hook, the two holding members being embodied by U-shaped saddles and the second holding member is both movable in a direction along a center axis of the first holding member and tiltable with respect to a center axis of the first holding member, the two holding members each being made of two plates which are interconnected by a connecting member located at a distance from the driving member, the connecting members of the first and second holding members having mutually matching shapes such that they are in engagement with each other in the second limit position.

2. The conveying means as claimed in claim 1, comprising stops which limit the longitudinal displacement and the tilting movement of the second holding member.

3. The conveying means as claimed in one of claims 1 or 2, wherein the driving member is cylindrical.

4. The conveying means as claimed in one of claims 1 or 2, wherein the driving member is of a generally frustoconical shape.

5. The conveying means as claimed in one of claims 1 or 2, wherein a spring moves the pawls in a direction contrary to a direction into which they are urged by the driving member.

6. The conveying means as claimed in claim 5, wherein the pawls are of C-shaped configuration.

7. The conveying means as claimed in claim 5, wherein the pawls are of S-shaped configuration.

8. The conveying means as claimed in one of claims 1 or 2, wherein each of the pawls is pivotable about a corresponding axis.

9. The conveying means as claimed in claim 8, wherein the mass center of each of the pawls is spaced a distance from the corresponding axis.

10. The conveying means as claimed in claim 1, wherein the connecting member of the first holding member is cylindrical.

11. The conveying means as claimed in claim 1, wherein guide means are provided to receive swing bearings which join the second holding member with the driving member.

12. The conveying means as claimed in claim 11, wherein the guide means include stops by which the vertical movement of the swing bearings is limited.

13. The conveying means as claimed in claim 11, wherein the guide means are embodied by slots.

14. The conveying means of claim 11, wherein the guide means comprise plates.

15. The conveying means of claim 14, wherein the plates are attached to the first holding member.

16. The conveying means as claimed in claim 1, wherein a portion of the second holding member is a wire.

* * * * *